(12) United States Patent
Gudipati

(10) Patent No.: US 12,205,161 B2
(45) Date of Patent: Jan. 21, 2025

(54) MULTIPLE PRODUCT IDENTIFICATION ASSISTANCE IN AN ELECTRONIC MARKETPLACE APPLICATION

(71) Applicant: eBay Inc., San Jose, CA (US)

(72) Inventor: Padmapriya Gudipati, San Jose, CA (US)

(73) Assignee: eBay Inc., San Jose, CA (US)

( * ) Notice: Subject to any disclaimer, the term of this patent is extended or adjusted under 35 U.S.C. 154(b) by 322 days.

(21) Appl. No.: 17/459,882

(22) Filed: Aug. 27, 2021

(65) Prior Publication Data

US 2023/0067956 A1 Mar. 2, 2023

(51) Int. Cl.
| | |
|---|---|
| *G06Q 30/00* | (2023.01) |
| *G06F 16/33* | (2019.01) |
| *G06F 16/35* | (2019.01) |
| *G06F 40/123* | (2020.01) |
| *G06F 40/18* | (2020.01) |
| *G06Q 30/0601* | (2023.01) |

(52) U.S. Cl.
CPC ..... *G06Q 30/0641* (2013.01); *G06F 16/3335* (2019.01); *G06F 16/35* (2019.01); *G06F 40/123* (2020.01); *G06F 40/18* (2020.01)

(58) Field of Classification Search
CPC .............. G06Q 30/00; G06Q 30/0601; G06Q 30/0613; G06Q 30/0641
See application file for complete search history.

(56) References Cited

U.S. PATENT DOCUMENTS

| | | | |
|---|---|---|---|
| 7,107,226 B1* | 9/2006 | Cassidy | G06Q 30/06 |
| | | | 707/999.005 |
| 7,337,166 B2* | 2/2008 | Bailey | G06F 16/2428 |
| 8,478,764 B2 | 7/2013 | Norton et al. | |
| 9,043,232 B1 | 5/2015 | Varadarajan | |
| 10,936,650 B2 | 3/2021 | Grandhi et al. | |

(Continued)

FOREIGN PATENT DOCUMENTS

| | | |
|---|---|---|
| CN | 202211020141.0 | 8/2022 |
| CN | 115730992 A | 3/2023 |

(Continued)

OTHER PUBLICATIONS

Parra, Nicolas A. "My Baseball Collection App." (2019). (Year: 2019).*

(Continued)

*Primary Examiner* — Christopher B Seibert
(74) *Attorney, Agent, or Firm* — FIG. 1 Patents

(57) ABSTRACT

A system and method for obtaining relevant information for identifying items that are being listed for sale via electronic marketplace applications. More specifically, the systems and methods relate to obtaining relevant attribute values and/or information for a plurality of items at relatively the same time. In aspects, the systems and methods involve receiving an electronic file or folder having a plurality of electronic representations of each of the items. The electronic file or folder is then parsed to separate the different items for identification. Once separated, the system and methods involve sending the separate items to an identification service and retrieving the separate information for each item and returned to the requesting device.

20 Claims, 4 Drawing Sheets

(56) References Cited

U.S. PATENT DOCUMENTS

| | | | | |
|---|---|---|---|---|
| 2001/0032170 A1* | 10/2001 | Sheth | ............... | G06Q 10/103 705/26.1 |
| 2003/0014317 A1* | 1/2003 | Siegel | ............... | G06Q 30/06 705/28 |
| 2003/0041302 A1* | 2/2003 | McDonald | ............... | G06F 40/163 715/263 |
| 2003/0220830 A1* | 11/2003 | Myr | ............... | G06Q 30/0245 705/14.54 |
| 2004/0243505 A1* | 12/2004 | Sweeting | ............... | G06Q 40/00 705/37 |
| 2004/0254950 A1* | 12/2004 | Musgrove | ............... | G06F 16/904 707/999.102 |
| 2005/0177474 A1* | 8/2005 | Ma | ............... | G06Q 30/0633 705/30 |
| 2006/0074780 A1* | 4/2006 | Taylor | ............... | G06Q 40/04 705/37 |
| 2007/0088625 A1* | 4/2007 | Fish | ............... | G06Q 30/02 705/26.7 |
| 2007/0094056 A1* | 4/2007 | Kang | ............... | G06Q 10/02 705/5 |
| 2007/0179868 A1* | 8/2007 | Bozym | ............... | G06Q 30/0601 705/26.1 |
| 2008/0052372 A1* | 2/2008 | Weber | ............... | G06F 16/58 707/E17.026 |
| 2008/0144883 A1* | 6/2008 | Kacker | ............... | H04N 1/00843 382/100 |
| 2008/0189212 A1* | 8/2008 | Kulakowski | ............... | G06Q 30/018 705/50 |
| 2009/0138817 A1* | 5/2009 | Oron | ............... | G06F 16/9577 715/788 |
| 2009/0150262 A1* | 6/2009 | Mizhen | ............... | G06Q 30/0601 705/26.1 |
| 2010/0205551 A1* | 8/2010 | Underwood | ............... | G06Q 30/0633 715/760 |
| 2011/0047014 A1* | 2/2011 | De Angelo | ............... | G06F 3/0482 715/810 |
| 2011/0059727 A1* | 3/2011 | Lisboa | ............... | H04W 4/00 455/414.1 |
| 2011/0161384 A1* | 6/2011 | Wykes | ............... | G06Q 30/0603 707/822 |
| 2011/0238484 A1* | 9/2011 | Toumayan | ............... | G06Q 30/0641 709/225 |
| 2012/0109713 A1* | 5/2012 | Wilhite | ............... | G06Q 30/0611 705/26.4 |
| 2012/0215665 A1* | 8/2012 | Marshall | ............... | H04L 67/02 705/27.1 |
| 2012/0226620 A1* | 9/2012 | Junger | ............... | G06Q 30/00 705/304 |
| 2012/0265648 A1* | 10/2012 | Jerome | ............... | G06Q 10/10 705/26.62 |
| 2013/0041778 A1* | 2/2013 | Nativ | ............... | G06Q 30/0633 705/26.62 |
| 2013/0151481 A1* | 6/2013 | Andrasick | ............... | G06F 16/9532 707/E17.014 |
| 2014/0180872 A1* | 6/2014 | Gura | ............... | G06Q 10/107 705/26.7 |
| 2014/0365535 A1* | 12/2014 | Dean | ............... | G06F 16/334 707/805 |
| 2015/0302011 A1 | 10/2015 | Ochial | | |
| 2017/0372392 A1* | 12/2017 | Metnick | ............... | G06Q 30/0613 |
| 2018/0053069 A1 | 2/2018 | Kale et al. | | |
| 2020/0057769 A1* | 2/2020 | Kass | ............... | G06F 16/24578 |
| 2020/0372570 A1 | 11/2020 | Macfarland | | |

FOREIGN PATENT DOCUMENTS

| | | |
|---|---|---|
| EP | 22191731.3 | 8/2022 |
| EP | 4141778 A1 | 3/2023 |

OTHER PUBLICATIONS

Fang, Jing, et al. "A table detection method for multipage pdf documents via visual seperators and tabular structures." 2011 International Conference on Document Analysis and Recognition. IEEE, 2011. (Year: 2011).*

European Patent Office, "European search report," issued in connection with European Patent Application No. 22191731.3 dated Jan. 16, 2023 (8 pages).

Jeffrey, "Starting this month Trading Card sellers can use 'Card Recognition' to quickly create eBay Listings", Retrieved from the Internet URL :<https://www.techspot.com/news/89209-trading-card-sellers-can-begin-using-card-recognition.html>, Apr. 6, 2021, 6 pages.

Liszewski, "eBay's App Can Now Recognize and Automatically Make Listings for Trading Cards You Want to Sell", Retrieved from the Internet URL :<https://gizmodo.com/ebays-app-can-now-recognize-and-automatically-make-list-1846626455>, Apr. 6, 2021, 4 pages.

* cited by examiner

MULTIPLE PRODUCT IDENTIFICATION ASSISTANCE IN AN ELECTRONIC MARKETPLACE APPLICATION

BACKGROUND

Various applications, such as electronic marketplace applications, are commonly utilized by users to sell and/or buy various items. To list an item for sale or to find an item for purchase in the electronic marketplace, a user generally must enter or otherwise provide various information values for identification of a product that may match the item. A listing for the item may then be generated based on product information associated with the product that matches the item and/or the matching product may be displayed for the user to enable the user to purchase the item. Entering or otherwise providing the various information for identifying a product that matches the item may be burdensome and time consuming for the user. Moreover, users may have many items to be sold, wherein each item has many different related attributes. As a specific example, a user may wish to sell trading cards, e.g., baseball cards and the like. The user may own hundreds of such card and entering related attribute information for each card would be tedious and error-prone.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

Aspects of the present disclosure relate to systems and methods for obtaining relevant attribute information for a plurality of items that are being listed for sale via electronic marketplace applications. In aspects, the systems and methods involve receiving an electronic folder or file having a plurality of electronic representations of each of the items. The electronic folder or file is then parsed to separate the different items for identification. Once separated, the system and methods involve sending the separate items to an identification service and retrieving the separate information for each item. In embodiments, the information is stored in a spreadsheet file listing the attribute information for each item in the electronic folder or file. A for-sale listing may further be generated based on product information associated with each identified item.

Systems described herein include a processor and a memory including instructions which, when executed by the processor, causes the processor to perform operations such as receiving an electronic container, the electronic container having electronic representations of each of the plurality of items stored therein; individually identifying each of the plurality of items by way of parsing the plurality of electronic representations stored in the electronic container; determining attribute values for each item of the plurality of items by way of evaluating each item of the plurality of items against a database of information; and providing related attribute values for each of the plurality of items. As stated, the electronic container may be an electronic file, folder, or the like, containing electronic representations of each item as electronic images. In embodiments, wherein an electronic file is used, the file contains predefined delimiters separating the each of the plurality of items. According to other aspects, the system may provide related attribute values are provided in a spreadsheet formatted file. According to other aspects, the system may further receive user-defined attribute values and/or may further automatically populate electronic marketplace defined fields using the related attribute values for each of the plurality of items.

In accordance with other aspects, the present disclosure relates to methods for assisting users in listing items for sale in an electronic marketplace via an electronic marketplace application, the method comprising steps of receiving an electronic container, the electronic container having electronic representations of each of the plurality of items stored therein; individually identifying each of the plurality of items by way of parsing the plurality of electronic representations stored in the electronic container; determining attribute values for each item of the plurality of items by way of evaluating each item of the plurality of items against a database of information; and providing related attribute values for each of the plurality of items. As stated, the electronic container may be an electronic file, folder, or the like, containing electronic representations of each item as electronic images. In embodiments, wherein an electronic file is used, the file contains predefined delimiters separating the each of the plurality of items. According to other aspects, the method may provide related attribute values are provided in a spreadsheet formatted file. According to other aspects, the method may further receive user-defined attribute values and/or may further automatically populate electronic marketplace defined fields using the related attribute values for each of the plurality of items.

In accordance with other aspects, the present disclosure relates to computer storage medium encoding computer executable instructions that, when executed by at least one processor, perform a method comprising receiving an electronic container, the electronic container having electronic representations of each of the plurality of items stored therein; individually identifying each of the plurality of items by way of parsing the plurality of electronic representations stored in the electronic container; determining attribute values for each item of the plurality of items by way of evaluating each item of the plurality of items against a database of information; and providing related attribute values for each of the plurality of items.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Aspects of the present disclosure relate to systems and methods for obtaining relevant information for identifying items that are being listed for sale via electronic marketplace applications. More specifically, the systems and methods relate to obtaining relevant attribute information for a plurality of items at relatively the same time. In aspects, the systems and methods involve receiving an electronic file or folder having a plurality of electronic representations of each of the items. The electronic file or folder is then parsed to separate the different items for identification. Once separated, the system and methods involve sending the separate items to an identification service and retrieving the separate information for each item. In embodiments, the information is stored in a spreadsheet file thereby listing the attribute information for each item in the electronic file or folder.

It should be appreciated that although, for exemplary purposes, described aspects generally relate to listing items for sale via an electronic marketplace application, the present methods and systems are not so limited. For example, identification assistance techniques described herein may be used to assist users in cataloging products or simply researching information on items they own.

Figure 1:
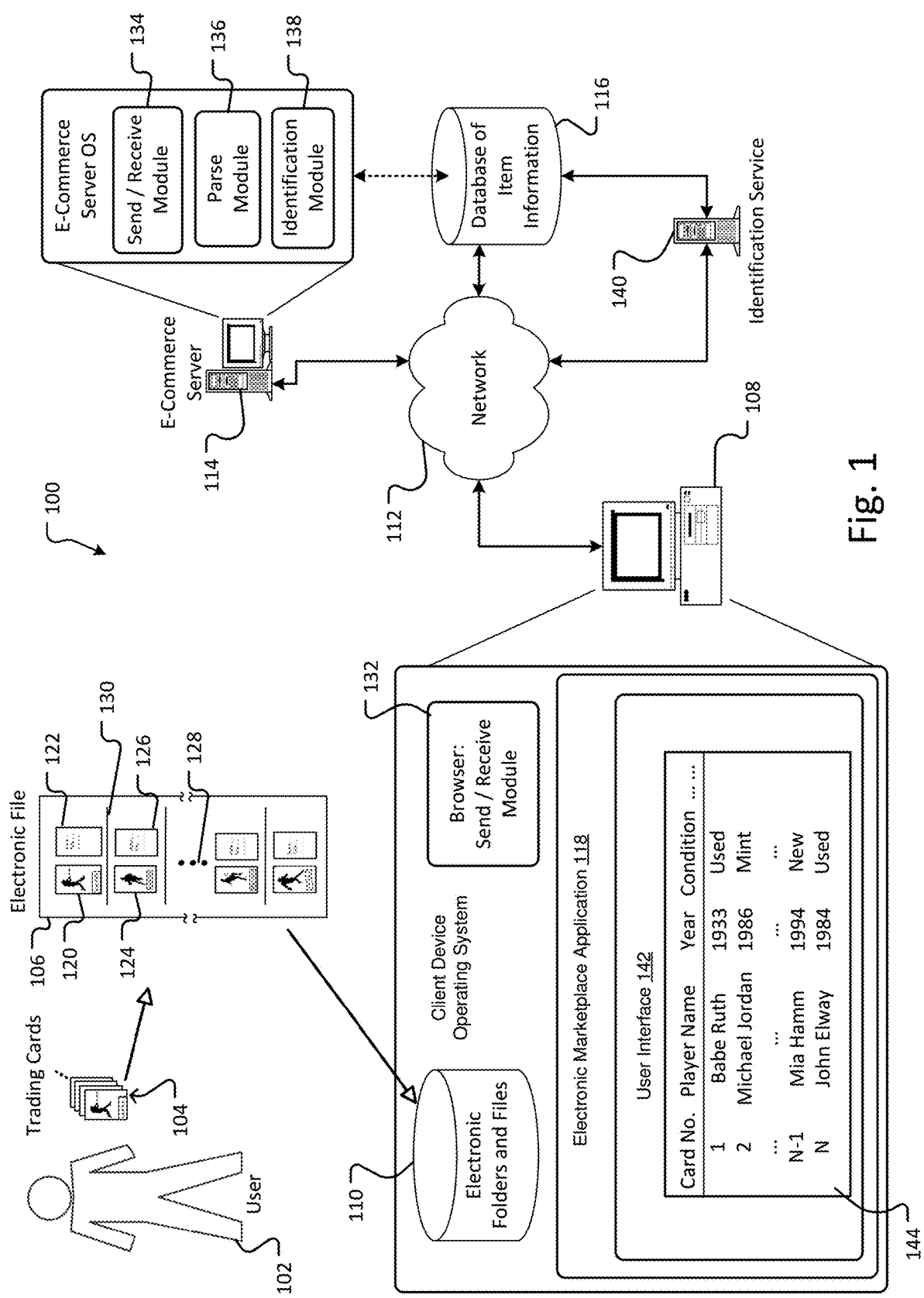
FIG. 1 illustrates an exemplary system for obtaining attribute information for a plurality of items to assist the users in listing items for sale using electronic marketplace applications, in accordance with aspects of the present disclosure.

FIG. 1 illustrates an exemplary environment 100 for obtaining attribute information for a plurality of items. As shown in FIG. 1, a user 102 may have a plurality of items, e.g., trading cards 104. The user 102 may scan the trading cards 104 and store the resulting images in an electronic container, such as an electronic folder or, as shown, the electronic file 106. Consequently, the electronic file 106 thereby has an electronic representation of each of the items 104, as discussed below. The electronic file 106 is then stored on a client device 108, e.g., within a local storage 110. The file 106 may then be sent, via network 112 to an e-commerce server 114 for processing. The e-commerce server parses the electronic file, and identifies the various items 104 and provides attribute information back to the client device 108, as discussed in more detail below.

The trading cards 104 are meant to show exemplary items which a user 102 may want more information on. In embodiments, the user has a plurality of trading cards 104 and wishes to list them for sale on the e-commerce server or on an electronic market place application, e.g., application represented by application 118. In order to list the items for sale, the user has to provide information on each item, e.g., the name of the item, a description of the item, the year the item was created, the condition of the item, the price for the item, etc. These various data elements for each item are referred to herein as attribute information. For instance, a specific trading card may be for baseball player Babe Ruth. Consequently, the attribute information for that trading card may include the name "Babe Ruth", the date "1933", and the condition of the card, e.g., "new", "used", "mint" or the like. Other attribute information may also be available, such as a suggested price for the item, or any other relevant information based on the item to be cataloged. While the trading cards are shown and described as sports-related trading cards, other trading cards are contemplated such as those used in Pokeman® games.

Determining this information, especially for a many items is a difficult task. Consequently, certain embodiments described herein relate to receiving an electronic file 106 having electronic representations of the plurality of items 104. Electronic file 106, according to embodiments, may be a pdf file (or other suitable file) wherein each item is represented as a scanned image within the pdf file. In certain embodiments, e.g., where the items are trading cards, a first image 120 may display the front of the trading card and a second, related image 122 may display the back of the trading card. To further example, the electronic file 106 shows a second trading card represented by front image 124 and a back image 126. The ellipses 128 represents that any number N of items may be potentially represented in the file 106.

There is, in embodiments, an electronic delimiter 130 between electronic representations of items, e.g., representations 122, 124. The electronic delimiter may be a page break or some other delimiter known by those skilled in the art. For instance, a predetermined amount of whitespace may be considered a delimiter for separating items, such as items 120 and 124. The delimiter is used during parsing of the file 106 to separate and identify the different items, e.g., items represented by representations 122 and 124. Also, as may be appreciated by those skilled in the art, the electronic file 106 may or may not include both front and back representations of each of the trading cards 104. Also, as will also be appreciated by those skilled in the art, the electronic file 106 may be an electronic folder containing files, wherein each file has an electronic representation of each of the trading cards 104.

As stated above, the electronic file 106 is stored on the client device 108. The client device 108 may be any computer device that may be configured to run or otherwise execute a client application, e.g., electronic market place application 118. Although only a single user device 108 is illustrated in FIG. 1, in some examples the system 100 may include multiple user devices 108. The one or more user devices 108 may include, but are not limited to, laptops, tablets, smartphones, and the like. The client or user device 108 includes electronic storage as represented by database 110. The user device 108 is further configured to run a plurality of applications, such as application 118. Applications that may run or otherwise execute on the one or more user devices 108 may include applications that allow users to engage with e-commerce servers, such as e-commerce server 114 (sometimes referred to herein as "electronic marketplace applications"), for example to allow users to post listings to sell items and/or to browse listing to buy items in the electronic marketplace. In some examples, the application 118 may relate to a web application, where such application may run or otherwise execute instructions within a web browser 132 having a send/receive module. In some examples, the client device 108 may include other applications, (not shown), and such application may also be web applications and/or include native client applications residing on the client device 108. The one or more user devices 108 may be communicatively coupled to an electronic marketplace application server, e.g., e-commerce server 114 via a network 112. The network 112 may be a wide area network (WAN) such as the Internet, a local area network (LAN), or any other suitable type of network. The network 112 may be a single network or may be made up of multiple different networks, in some examples.

With continued reference to FIG. 1, the system 100 may include an item information database 116, which includes attribute information on the items of interest 104. The item information database 116 may be communicatively coupled to the e-commerce server 114 and/or to the user device 108 via the communication network 112, as illustrated in FIG. 1, or may be coupled to the e-commerce server 114 and/or to the user device 108 in other suitable manners. For example, the item information database 116 may be directly or indirectly connected to e-commerce server 114, or may be included as part of the e-commerce server 114, in some examples. The item information database 116 may be a single database or may include multiple different databases.

In embodiments, the item information database 116 is used by the e-commerce server 114 to populate a spreadsheet with attribute information for each item in an electronic folder 106. The e-commerce server has a send/receive module 134 for receiving the file 106 and for sending results back to the client device 108. The e-commerce server 114 further has a parse module 136 which parses the file 106 to separate the separate items within the file 106. In embodiments, the e-commerce server 114 further includes an identification module 138 which identifies the separate, parsed items in file 106. The identification module may utilize the database of item information 116 to both identify the items and/or to ascertain attribute information for each item. In other embodiments, the e-commerce server may parse the file 106 and then use an identification service 140 to identify and ascertain attribute information for each item in folder 106. Identification service may be connected to the e-commerce server through the network 112 and/or through other known methods of connectivity. The identification service may further be directly connected to the database of item information 116 or indirectly connected, which methods would be known by those skilled in the art.

Once the file is parsed, and the attribute information is ascertained for the items in the file 106, the e-commerce server 114 returns the attribute information to the client device 108. As show shown in FIG. 1, the information is shown in user interface 142 as table 144. The information shown in table 144 provides, for this example, a card number, a player name, the year of the card, and a determined condition of the card. The table of information 144 may include other information as well, as may be appreciated by those skilled in the art, such as a suggested price for the card, related products, etc. In certain embodiments, the information in table 144 may be partially complete as all information may not be readily available or ascertainable in all circumstances. Additionally, while shown as a table of information, the attribute information in table 144 may be delivered in various different formats, e.g., a text file, a spreadsheet file, a csv file, or the like. The file is delivered to the client device 108, which then is able to display the same in user interface 142.

The user interface 142 relates to the electronic marketplace application 118. Consequently, the attributes returned in table 142 typically relate to the attributes for buying or selling the items 104 using the application. In other embodiments other embodiments, the user may define the information desired related to the set of items represented in file 106.

Figure 2:
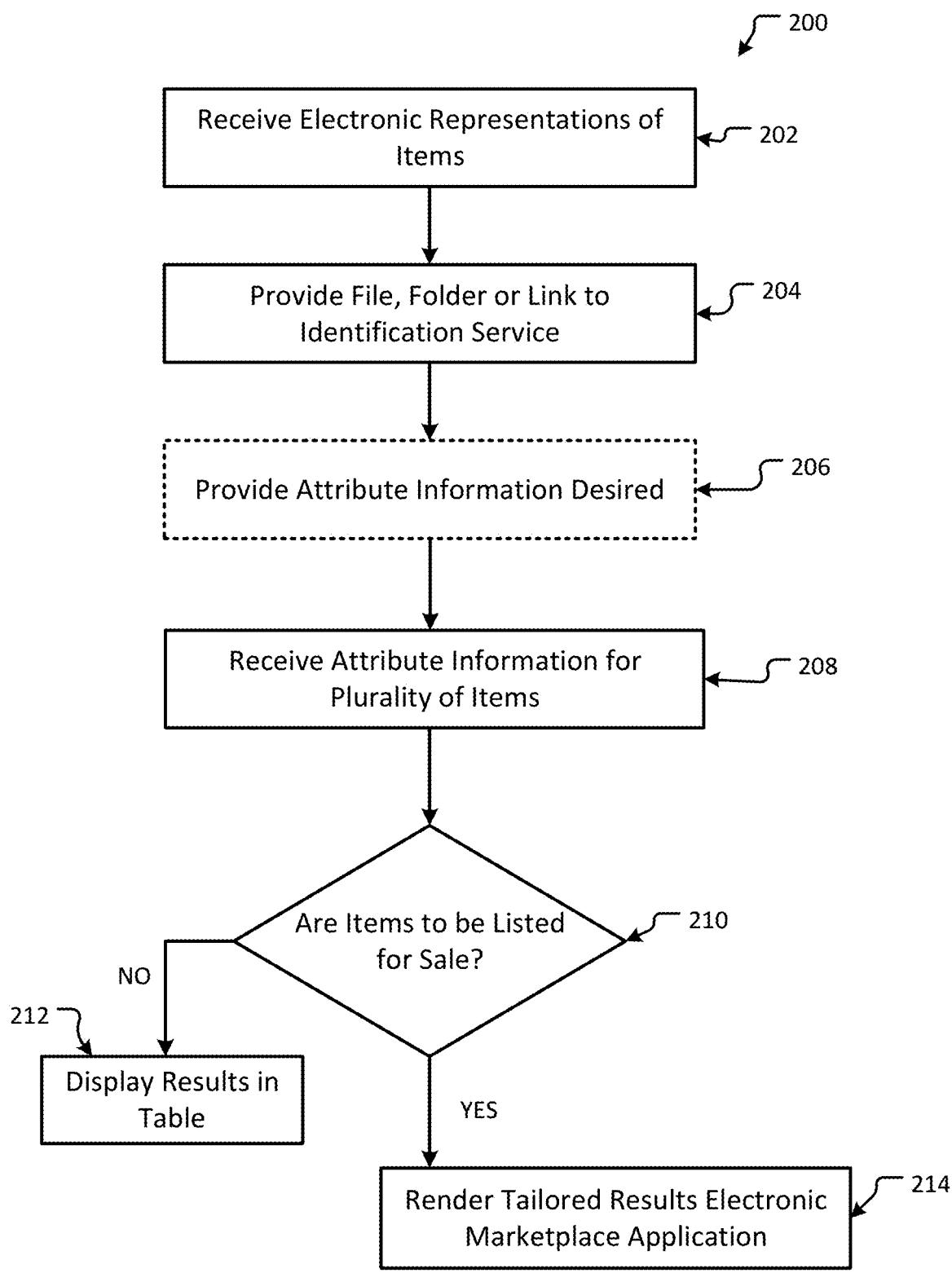
FIG. 2 is an exemplary method for obtaining attribute information for a plurality of items from a server, in accordance with aspects of the present disclosure.

FIG. 2 illustrates an exemplary method 200 for obtaining relevant attribute information for a plurality of items having electronic representations in an electronic file or folder. In an example, the method 200 may be performed by a client device to assist a user in listing a plurality of items for sale in an electronic marketplace using an electronic marketplace application. A general order of the operations for the method 200 is shown in FIG. 2. The method 200 may include more or fewer steps or may arrange the order of the steps differently than those shown in FIG. 2. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3 and 4.

Method 200 begins at operation 202 wherein a client device receives electronic representations of a plurality of items. Operation 202 relates to an operational step wherein a user may upload an electronic file, wherein the file itself contains images of a plurality of items. In other embodiments, operation 202 relates to the user creating an electronic folder, wherein the sub-files of the electronic folder each contain separate images or item identifying information for later analysis. In yet another embodiment, operation 202 relates to acquiring, receiving or identifying a link or path information to location having an electronic folder or file to be used in identifying attribute information for a plurality of items. Those skilled in the art will appreciate other manners of creating and storing the electronic representations of various items of interest, i.e., those items for which attribute information is desired, and potentially those items of interest that may be ultimately listed for sale. Typical examples would be scanning electronic images of the items into a singular pdf (or other suitable format) file, scanning electronic images of the items into separate pdf files, but stored in one folder, etc. Once the file or files are created, the items are stored on the client device thereby received at operation 202.

Next, operation 204 provides the file, folder or link to an identification service. In an embodiment, the identification service is an e-commerce server used by an electronic marketplace application for buying and selling items. It will be appreciated that many different steps may be included in providing the file, folder or link to the e-commerce server. For instance, a user may open and display an e-commerce application user interface on the client device, and then follow user-interface-directed cues to select and upload the file to the server. A user may further follow user-interface cues to point the e-commerce server application to the path or location for the e-commerce application or server to provide path location information to the server for processing. Those skilled in the art will recognize many different ways to upload a file or folder to a server.

An optional operation of providing desired attribute information 206 may also be performed. Operation 206 relates to a situation where the user may want specific or additional types of attribute information related to the items of interest. For instance, a user may or may not want suggested price information for the items. Alternatively, the user may or may not want the system to judge the quality or condition of the items of interest. In such cases the operational step 206 allows for the user to help dictate what attribute information should be returned (or not). Operation 206 may further relate to the user providing a category or type for the various items in the electronic file or folder. In other embodiments, the client device recognize a category or type of item in the file or folder and provide that information to the e-commerce server to aid in attribute information retrieval.

Next, the client device receives the attribute information at receive operation 208. Receive operation 208 relates to the receipt of a spreadsheet file or other suitably formatted file containing the information collected by the e-commerce server, such as server 114 described above in conjunction with FIG. 1. In alternative embodiments, receive operation involves receiving consecutive packets of information, each packet related to an item in the file or folder.

In embodiments, following the receipt of the attribute information at operation 208, the method determines at determine operation 210 if the items are to be listed for sale. If not, then flow branches NO to display operation 212 wherein the attribute information is displayed for the multiple items in the file or folder. The display may be automatic, e.g., within an application to designed to receive and display such information or a user may request the display of the information. Further, if the information is received as an electronic file, the information may be displayed in other applications, e.g., a separate spreadsheet application.

If determine operations 210 determines that the items are to be listed for sale, e.g., within an electronic marketplace application, such as application 118 shown in FIG. 1, then flow may branch YES to render results operation 214. Render results operation 214 relates to the automatic population of fields of information either required or proposed for users to sell their items in a marketplace application. As an example, the marketplace application may require users to provide a name, condition and price for each item they wish to sell. The application may further propose that the user provide a description of the item. Render tailored results operation 214 may be used to create records for selling the items and automatically populating some or all of these fields for the user. The user may be able to edit the fields after operation 214 prior to actually selling the items on the marketplace application.

Figure 3:
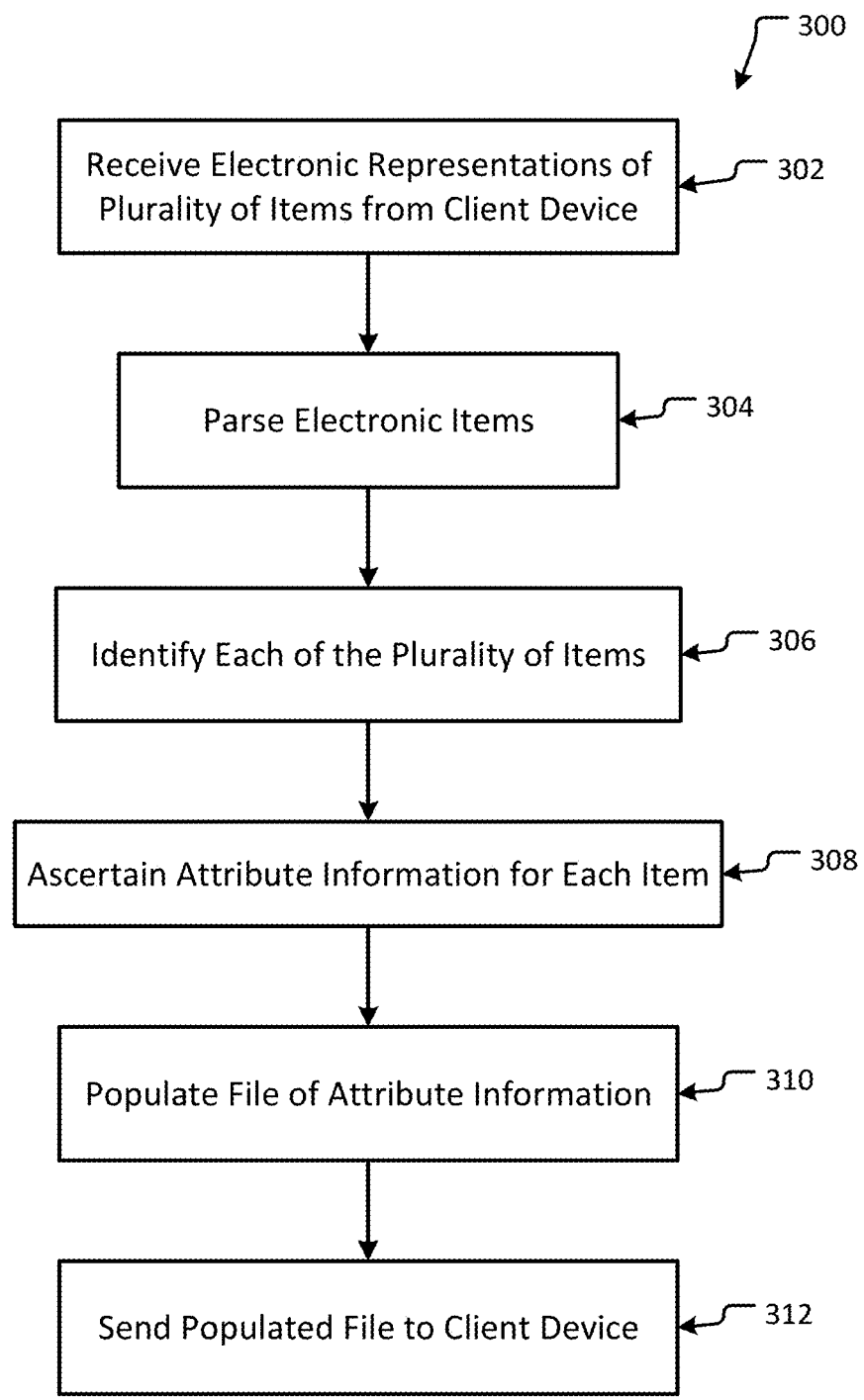
FIG. 3 illustrates an exemplary method for determining attribute information in response to receiving an electronic file or folder from a client user device via an electronic marketplace application, in accordance with aspects of the present disclosure.

FIG. 3 illustrates an exemplary method 300 for providing relevant attribute information for a plurality of items having electronic representations in an electronic file or folder to a client device, such as client device 108 shown in FIG. 1. In an example, the method 300 may be performed by a server system, such as e-commerce server 114 shown and described above in conjunction with FIG. 1. A general order of the operations for the method 300 is shown in FIG. 3. The method 300 may include more or fewer steps or may arrange the order of the steps differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2 and 4.

Initially, receive operation 302 receives, in some form, an electronic representation of a plurality of items. The electronic representation may relate to a file or a folder having images stored therein, such as depicted by electronic file 106 shown in FIG. 1. While receive operation may receive a file or a folder, receive operation may also receive path information indicating the storage location of the electronic representations of the images as well. Once the path information is received, in embodiments, the electronic representations of the items are accessed and moved and/or copied over to the server system for processing.

Following receive operation 302, parse items operation 304 parses the file or folder of electronic representations. Parse operation 304 essentially evaluated the electronic file or folder to separately identify each item in the file or folder. Parse 304 may evaluate each image as separate item or may seek electronic delimiters to effectively separate the items in the file or folder. Electronic delimiters may be page breaks, predetermined amounts of whitespace or, in the case of a folder, separate files may relate to delimiters. If two or more images fall between delimiters, parse operation 304 may use the two or more images as different perspectives of the same item, e.g., in the case of the item of interest being a trading card, the front of the card may be a first image and the back of the card may be a second image of the same item. Combining image information for a single item is known in the art.

Once separated, ascertain attribute information operation 308 ascertains the specific attribute information for each item in the file or folder. Ascertain operation 308, according to some embodiments, first identifies an item, and then looks up the information in a database of items. Next, another item is identified and the relevant information is looked up. This process continues until all items have been identified and their relevant information has been looked up. In other embodiments, once the items have been identified, ascertain sends a request or a batch of separate requests for information on that item or all items to an identification service. That service may then access a database of information to provide attribute information in return. While the goal would be to ascertain all information on all items, it is possible the database may not have certain information on some items therefore may not fully ascertain all attributes for all items.

As information is being ascertained, in embodiments, populate operation 310 populates a data file with the relevant information for each item. In so doing, populate file operation 310 may provide a unique identifier for each item, and then populate certain fields of information for each item. Such cataloging enables the user to separately identify or match the attribute information with the items in their position.

Following the population operation 310, send operation 312 sends the information and/or file back to the requesting client device. Send operation 312 may alternatively store the information on the e-commerce server in a profile for associated user. Such storage may be beneficial if the user intends on listing the items for sale, and in such case the user may simply access the stored file to populate fields of information used in listing the items for sale.

Figure 4:
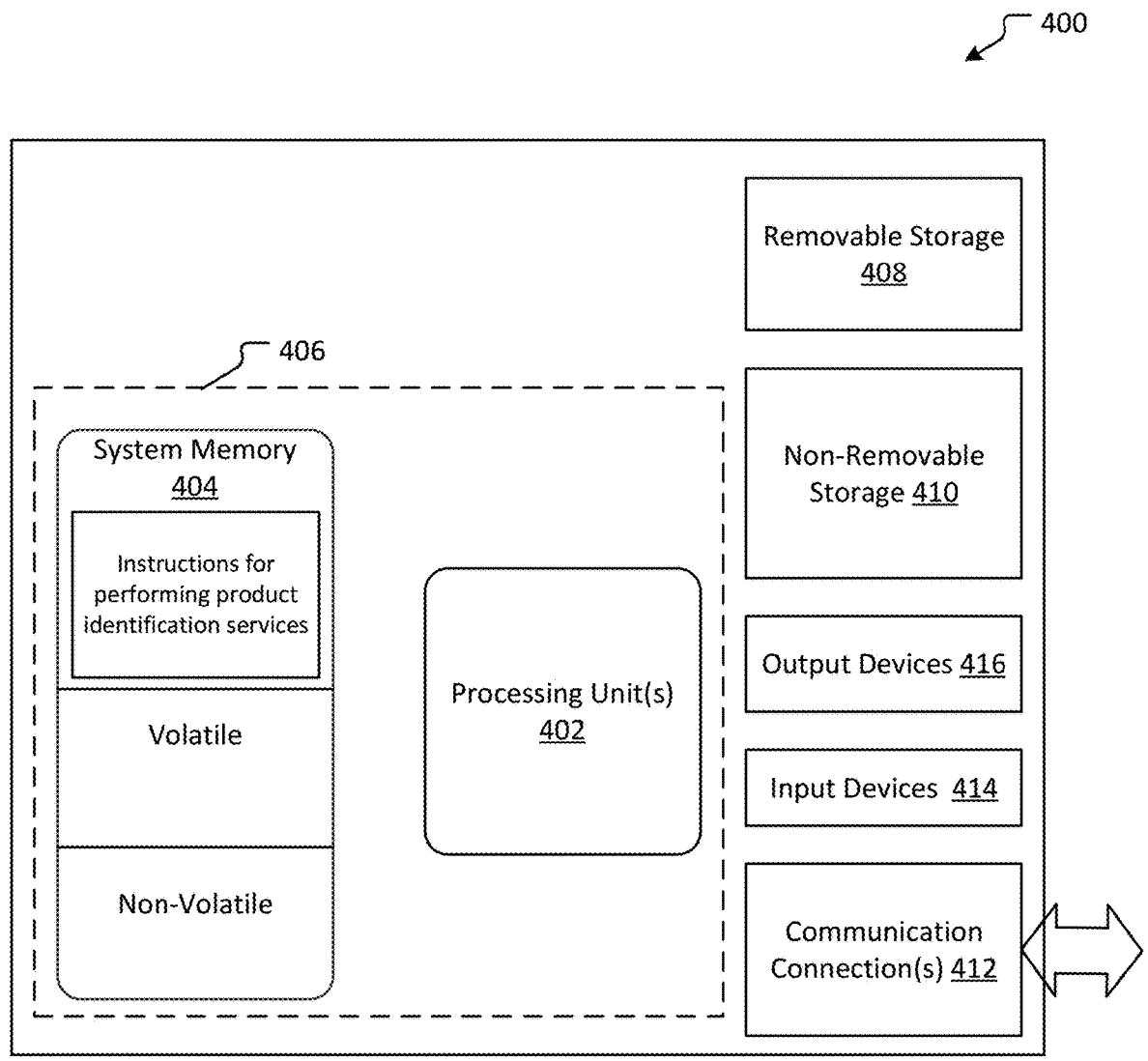
FIG. 4 is a block diagram illustrating example physical components of a computing device with which aspects of the disclosure may be practiced.

FIG. 4 illustrates a simplified block diagram of the device with which aspects of the present disclosure may be practiced in accordance with aspects of the present disclosure. One or more of the present aspects may be implemented in an operating environment 400. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 400 typically includes at least one processing unit 402 and memory 404. Depending on the exact configuration and type of computing device, memory 404 (instructions for performing product identification services described herein) may be volatile (such as RAM), non-volatile (such as ROM, flash memory, etc.), or some combination of the two. This most basic configuration is illustrated in FIG. 4 by dashed line 406. Further, the operating environment 400 may also include storage devices (removable, 408, and/or non-removable, 410) including, but not limited to, magnetic or optical disks or tape. Similarly, the operating environment 400 may also have input device(s) 414 such as keyboard, mouse, pen, voice input, on-board sensors, etc. and/or output device(s) 416 such as a display, touchscreens, accelerometers, speakers, printer, motors, etc. Also included in the environment may be one or more communication connections, 412, such as LAN, WAN, a near-field communications network, point to point, etc.

Operating environment 400 typically includes at least some form of computer readable media. Computer readable media can be any available media that can be accessed by at least one processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, the system comprising:
   a processor; and
   memory including instructions which, when executed by the processor, causes the processor to perform operations comprising:
   receiving, by a marketplace application server, an electronic container, the electronic container storing electronic representations of respective items of a plurality of items;
   parsing, based on an electronic delimiter that separates the electronic representations of the respective items and by a parse module of the marketplace application server, the electronic representations stored in the electronic container to individually identify the respective items of the plurality of items stored in the electronic container, wherein two or more electronic representations that fall between delimiters are associated with respective perspectives of a same item;
   assigning, by an identification module of the marketplace application server, respective unique identifiers to the plurality of items based on individually identifying the respective items of the plurality of items;
   accessing, by the marketplace application server, a database to obtain respective attribute values for the respective items of the plurality of items, the database including attribute information corresponding to at least the plurality of items;

storing, by the marketplace application server, for the respective items of the plurality of items, and at a second database, the respective unique identifiers and the respective attribute values; and automatically populating, by the marketplace application server in a user interface, one or more fields of a listing for sale of at least one item of the plurality of items based on accessing the second database to obtain a unique identifier and one or more attribute values associated with the at least one item.

2. The system of claim 1, wherein the electronic container is a single electronic file.

3. The system of claim 1, wherein the electronic container is a single folder.

4. The system of claim 1, wherein the electronic container is a single electronic file and wherein the electronic representations of the respective items are electronic images.

5. The system of claim 1, wherein the operations further comprise:

providing the respective attribute values for the respective items of the plurality of items in a spreadsheet formatted file.

6. The system of claim 1, wherein the operations further comprise:

receiving, via the user interface, user input that indicates attribute identifiers corresponding to at least one attribute value of the respective attribute values for the respective items.

7. A method, the method comprising:

receiving, by a marketplace application server, an electronic container, the electronic container storing electronic representations of respective items of a plurality of items;

parsing, based on an electronic delimiter that separates the electronic representations of the respective items and by a parse module of the marketplace application server, the electronic representations stored in the electronic container to individually identify the respective items of the plurality of items stored in the electronic container, wherein two or more electronic representations that fall between delimiters are associated with respective perspectives of a same item;

assigning, by an identification module of the marketplace application server, respective unique identifiers to the plurality of items based on individually identifying the respective items of the plurality of items;

accessing, by the marketplace application server, a database to obtain respective attribute values for the respective items of the plurality of items, the database including attribute information corresponding to at least the plurality of items;

storing, by the marketplace application server, for the respective items of the plurality of items, and at a second database, the respective unique identifiers and the respective attribute values; and automatically populating, by the marketplace application server in a user interface, one or more fields of a listing for sale of at least one item of the plurality of items based on accessing the second database to obtain a unique identifier and one or more attribute values associated with the at least one item.

8. The method of claim 7, wherein the electronic container is a single electronic file.

9. The method of claim 7, wherein the electronic container is a single folder.

10. The method of claim 7, wherein the electronic container is a single electronic file and wherein the electronic representations of the respective items are electronic images.

11. The method of claim 7, further comprising:

providing the respective attribute values for the respective items of the plurality of items in a spreadsheet formatted file.

12. The method of claim 7, further comprising:

receiving user-defined attribute value identifiers, wherein the respective attribute values are related to the user-defined attribute value identifiers.

13. A computer storage medium encoding computer executable instructions that, when executed by at least one processor, perform a method comprising:

receiving, by a marketplace application server, an electronic container, the electronic container storing electronic representations of respective items of a plurality of items;

parsing, based on an electronic delimiter that separates the electronic representations of the respective items and by a parse module of the marketplace application server, the electronic representations stored in the electronic container to individually identify the respective items of the plurality of items stored in the electronic container, wherein two or more electronic representations that fall between delimiters are associated with respective perspectives of a same item;

assigning, by an identification module of the marketplace application server, respective unique identifiers to the plurality of items based on individually identifying the respective items of the plurality of items;

accessing, by the marketplace application server, a database to obtain respective attribute values for the respective items of the plurality of items, the database including attribute information corresponding to at least the plurality of items;

storing, by the marketplace application server, for the respective items of the plurality of items, and at a second database, the respective unique identifiers and the respective attribute values; and automatically populating, by the marketplace application server in a user interface, one or more fields of a listing for sale of at least one item of the plurality of items based on accessing the second database to obtain a unique identifier and one or more attribute values associated with the at least one item.

14. The computer storage medium of claim 13, wherein the electronic container is an electronic file and the electronic representations of the respective items of the plurality of items are images.

15. The computer storage medium of claim 13, wherein the electronic container is an electronic folder.

16. The system of claim 1, wherein the electronic delimiter includes an amount of whitespace.

17. The method of claim 7, wherein the electronic delimiter includes an amount of whitespace.

18. The computer storage medium of claim 13, wherein the electronic delimiter includes an amount of whitespace.

19. The system of claim 6, wherein:

the attribute identifiers comprise one or more of a price information attribute identifier associated with the plurality of items or a condition attribute identifier associated with the plurality of items; and the at least one attribute value comprises one or more of a price value corresponding to the price information attribute identifier or a condition value corresponding to the condition attribute identifier.

20. The system of claim 19, and wherein the one or more fields of the listing for sale of the at least one item comprise a name field, a price field, or a condition field.

* * * * *